United States Patent [19]

Badowski

[11] Patent Number: 4,781,130

[45] Date of Patent: Nov. 1, 1988

[54] SYSTEM FOR STITCHING ALONG A CURVE

[75] Inventor: Thaddeus A. Badowski, Strongsville, Ohio

[73] Assignee: Barudan America, Inc., Walton Hills, Ohio

[21] Appl. No.: 906,248

[22] Filed: Sep. 12, 1986

[51] Int. Cl.⁴ ............................................. D05B 21/00
[52] U.S. Cl. .................................. 112/121.12; 112/456; 112/454; 112/457
[58] Field of Search ............... 112/121.12, 121.11, 112/456, 454, 457, 266.1, 262.3, 102, 103, 78, 458

[56] References Cited

U.S. PATENT DOCUMENTS

| | | | |
|---|---|---|---|
| 4,280,424 | 7/1981 | Carbonato et al. | 112/454 X |
| 4,352,334 | 10/1982 | Childs et al. | 112/266.1 |
| 4,383,489 | 5/1983 | Sugiyama et al. | 112/121.12 X |
| 4,557,207 | 12/1985 | Turner et al. | 112/121.12 X |
| 4,622,907 | 11/1986 | Kimura | 112/121.12 |
| 4,660,488 | 4/1987 | Hanyu et al. | 112/456 X |

*Primary Examiner*—Peter Nerbun
*Attorney, Agent, or Firm*—James A. Hudak

[57] ABSTRACT

A system and method for stitching characters along a curve is disclosed. The alphabetic characters, numerals, symbols, designs, etc. to be sewn or embroidered, along with various other parameters, such as the initial radius and angular displacement of the curve on which the selected characters, etc. are to be stitched, are entered into the system by the operator. The system transforms the stitch points within each selected character, etc. into a new set of stitch points such that the selected characters, etc. are projected into a curve having the desired initial radius and initial angular displacement.

21 Claims, 2 Drawing Sheets

SYSTEM FOR STITCHING ALONG A CURVE

TECHNICAL FIELD

The present invention relates generally to a computer controlled sewing or embroidering machine, and more particularly to a system and method for controlling the operation of such a sewing or embroidering machine so that it can stitch along a curve.

BACKGROUND ART

Stitch patterns for computer controlled sewing or embroidering machines are readily available. Such stitch patterns may be stored as stitch movement comands on a punched paper tape which can be "inputted" into the sewing or embroidering machine to direct the machine to stitch the pattern, which is embodied in the paper tape, on fabric or other material. Another approach utilizes predetermined patterns which are stored in a computer memory and subsequently retrieved from memory when stitching of the pattern is rerequired. With either of these approaches, if the pattern is to be stitched along a curve, parameters defining the curve are used to generate a unique set of stitch movement commands which are stored on the punched paper tape or in the computer memory. The end result is that each stitch pattern, whether on a straight line or on a curve, becomes a "custom" set of instructions for that specific pattern and the pattern cannot be easily modified. If a different stitch pattern or curve is desired, a new stitch pattern must be developed and punched into a paper tape or placed in the computer memory. Thus, virtually no commonality exists between stitch patterns and a new stitch pattern must be developed for each specific application.

In view of the foregoing, it has become desirable to develop a system and a method for stitching selected characters along a curve by merely entering into the system those characters to be sewn or embroidered and parameters defining the curve on which the characters are to be stitched.

SUMMARY OF THE INVENTION

The present invention solves the aforementioned problems associated with the prior art as well as other problems by providing a novel system and method for stitching characters along a curve. The alphabetic characters, numerals, symbols, designs, etc. to be sewn or embroidered are selected by means of an operator console or keyboard. The initial radius and the initial angular displacement of the curve on which the selected alphabetic characters, numerals, symbols, designs, etc. are to be positioned are also selected by the machine operator or may be determined by the system if other operating parameters are entered therein. The data needed to generate the stitches required for each of the alphabetic characters, numerals, symbols, designs, etc. which may be chosen are stored in a first memory device and are retrieved from same when needed and transmitted to a stitch generator. The stitch generator produces one or more stitch points for each selected alphabetic character, numeral, symbol, design, etc. Those stitch points are transmitted to a curve generator which generates a new set of stitch points such that the selected alphabetic characters, numerals, symbols, designs, etc. are projected onto a curve having the desired initial radius and the initial angular displacement. The curve generator accomplishes the foregoing by converting a stitch point into a cartesian co-ordinate position in a straight stitch field, transforming the cartesian co-ordinate position into a new position in a curved stitch field which conforms to a curve of the desired initial radius and the initial angular displacement, determining the cartesian co-ordinates of the new position in the curved stitch field, and then generating a new stitch point from the new set of cartesian co-ordinates. The foregoing steps can be performed sequentially for each stitch point or a plurality of stitch points can be processed sequentially as a group. The resewing new stitch points, which are a function of the cartesian co-ordinates of the stitch point in the original straight stitch field and the desired initial radius and the initial angular displacement of the curve on which the characters, etc. are to be positioned, are then transmitted to a stitch movement command generator which produces a stitch movement command or commands for each stitch point and transmits same to the stitching apparatus which translates these stitch movement commands into incremental movements of a cloth frame in the x direction and/or the y direction permitting the selected characters, numerals, symbols, designs, etc. to be sewn or embroidered along the desired curve.

DESCRIPTION OF THE PREFERRED EMBODIMENT

Figure 1:
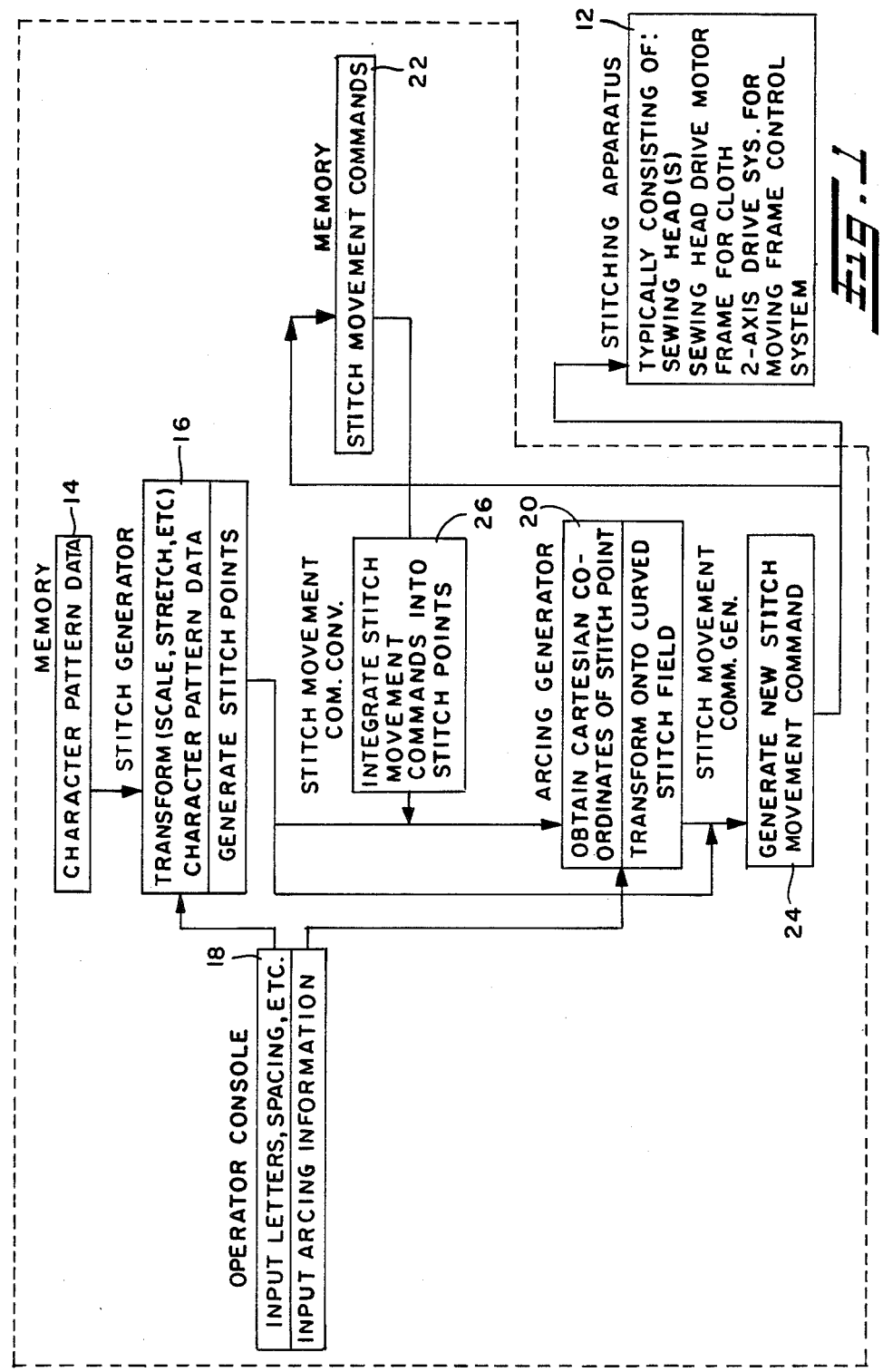
FIG. 1 is a schematic diagram of a control system for a stitching apparatus wherein the control system incorporates the present invention.

Referring now to the drawings where the illustrations are for the purpose of describing the preferred embodiment of the present invention and are not intended to limit the invention hereto, FIG. 1 is a schematic diagram of a control system 10 for a stitching apparatus 12 wherein the system 10 utilizes the present invention. In addition to the stitching apparatus 12, the system 10 also includes a first memory device 14, a stitch generator 16, an operator console or keyboard 18, a curve generator 20, a second memory or storage device 22, a stitch movement command generator 24 and a stitch movement command converter 26.

The first memory device 14 can be a random access memory (RAM), a read only memory (ROM), a programmable read only memory (PROM), a floppy disc, etc. and is connected to the stitch generator 16. This memory device 14 is used for storing the data required to generate the stitches comprising the alphabetic characters, numerals, symbols, designs, etc. which are to be sewn or embroidered by the stitching apparatus 12. In essence, the outline of the stitched area of each alphabetic character, numeral, symbol, design, etc. is divided into straight, curved, or irregularly shaped segments, each of which is generally defined by a first stitch or line of stitches, a second stitch or line of stitches, one edge connecting one end of the first stitch or line of stitches to an end of the second stitch or line of stitches, and another edge connecting the other end of the first stitch or line of stitches to the other end of the second stitch or line of stitches, all of the foregoing data being stored, explicitly or implicitly, in the memory device 14. By dividing the alphabetic characters, numerals, symbols, designs, etc. into such segments and by including the intermediate displacements to interconnect the resulting stitch segments, the overall configuration of each character, numeral, symbol, design, etc., along with the orientation of the segments with respect to one another and the proportionality between segments, can be stored in this memory device 14 for use during the sewing or embroidering process.

The operator console or keyboard 18 is connected to the stitch generator 16 and is utilized for selecting the individual alphabetic characters, numerals, symbols, designs, etc., or group of same, to be sewn or embroidered for entry into the stitch generator 16. The selected alphabetic characters, numerals, symbols, designs, etc. are entered in the order desired for the resulting sewn or embroidered display. In addition, other parameters can be entered into the stitch generator 16 by means of the operator console or keyboard 18, such as sizing, scaling and/or sloping data for the selected alphabetic characters, numerals, symbols, designs, etc.; the spacing desired between adjacent alphabetic characters, numerals, symbols, designs, etc. or between adjacent lines of same; the desired stitch density; and a relative starting reference point for each line or lines of alphabetic characters, numerals, symbols, designs, etc. to be sewn or embroidered. The operator console or keyboard 18 is also connected to the curve generator 20 and is utilized for entering the desired initial radius $R_o$ and the initial angular displacement $\theta_o$ of the curve or curves on which the respective line or lines of alphabetic characters, numerals, symbols, designs, etc. are to be sewn or embroidered; alternatively, the initial radius $R_o$ and the initial angular displacement $\theta_o$ may be determined by the system 10 through the entry of other parameters via the operator console or keyboard 18. For example, to center a curve having a specific subtended angle, the subtended angle is entered into the 10 via the operator console or keyboard 18, and the system 10 can compute the initial radius $R_o$ and the initial angular displacement $\theta_o$ of a curve having the desired subtended angle centered about a vertical axis.

The stitch generator 16 connects the first memory device 14 to the curve generator 20 and is utilized to transform the data required to generate the stitches comprising the alphabetic characters, numerals, symbols, designs, etc. into stitch points which define or determine the placement of stitches within the foregoing segments defining the selected alphabetic characters, numerals, symbols, designs, etc. The stitch generator 16 accomplishes the foregoing by accessing the first memory device 14 for the data required to generate the stitches comprising the selected alphabetic characters, numerals, symbols, designs, etc. to be sewn or embroidered and for other relevant data contained therein, and then sizing, scaling and/or sloping the data defining the segments of each selected alphabetic character, numeral, symbol, design, etc., to be sewn or embroidered. After sizing, scaling and/or sloping the data defining the segments, the size of the resulting envelope defining each segment is determined and used to find the total number of stitches required to fill the envelope. This determination of the total number of stitches is a function of the desired stitch density and the size of the segment envelope. Based upon the foregoing, the stitch generator 16 produces the required number of stitch points to fill each stitch segment. If no "curving" of the selected alphabetic characters, numerals, symbols, designs, etc. is required, the stitch points can be transmitted directly to the stitch movement command generator 24 which produces a stitch movement command or commands for each stitch point which, in turn, are transmitted to the stitching apparatus 12. Alternatively, the resulting stitch movement command or commands can be transmitted to the second memory or storage device 22 for storage purposes. The second memory or storage device 22 can be in the form of a random access memory (RAM), a read only memory (ROM), a programmable read only memory (PROM), a floppy disc or a punched paper tape, etc. And lastly, the stitch points can be transmitted to the curve generator 20 which is connected to the stitch generator 16.

Figure 2:
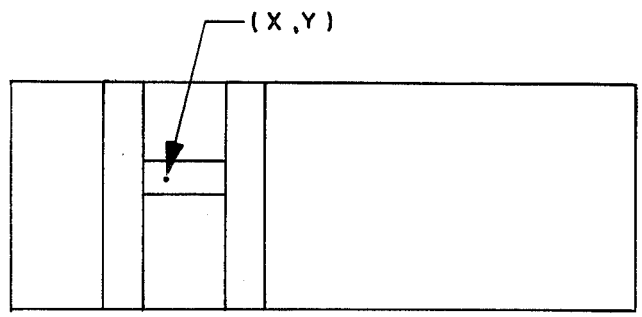
FIG. 2 illustrates an alphabetic character and a stitch point in a straight field of stitch points.
Figure 3:
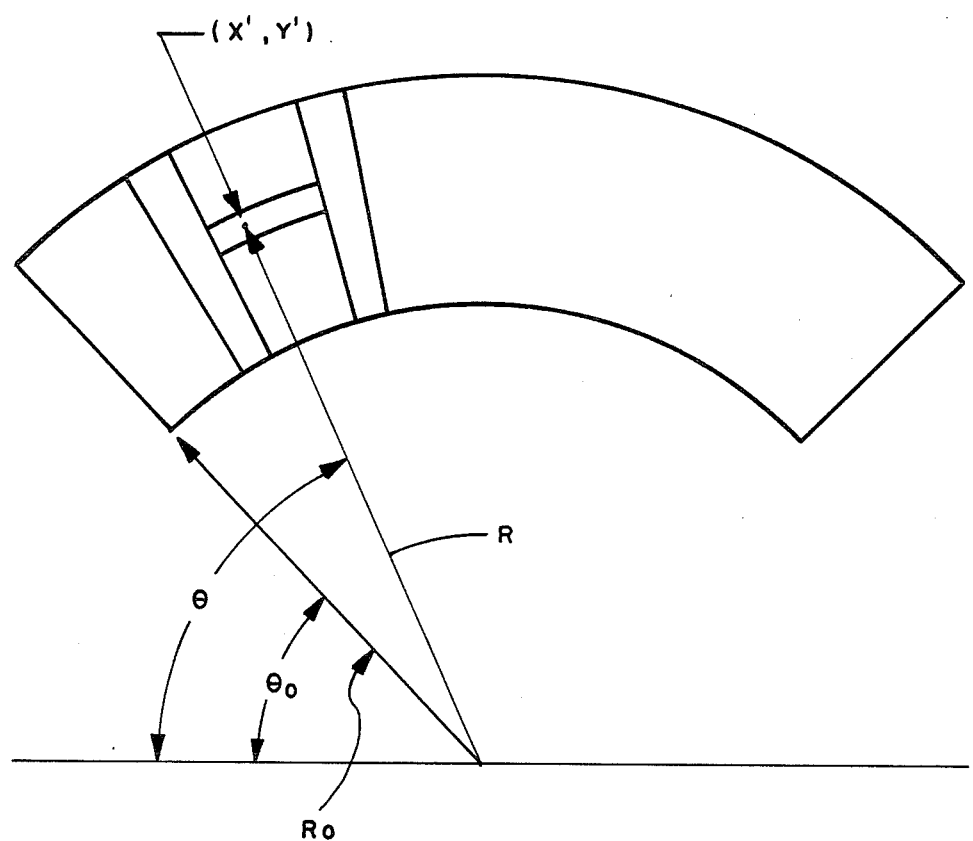
FIG. 3 illustrates the resulting "transformed" alphabetic character and a stitch point in a curved field of stitch points.

As stitch points for each line of selected alphabetic characters, numerals, symbols, designs, etc. are received by the curve generator 20, a new set of stitch points is generated such that the selected alphabetic characters, numerals, symbols, designs, etc. will be projected into a curve having a desired initial radius R and initial angular displacement $\theta_o$. The curve generator 20 accomplishes the foregoing by converting a stitch point into a cartesian co-ordinates position in a straight stitch field, transforming this cartesian co-ordinate position into a new position in a curved stitch field which conforms to a curve of the desired initial radius $R_o$ and the initial angular displacment $\theta_o$, and then determining the cartesian co-ordinates of the new position in the curved stitch field. The foregoing process can be performed sequentially for each stitch point or a plurality of stitch points can be processed as a group. The resulting cartesian co-ordinates are a function of the original cartesian co-ordinates, and the desired or determined initial radius $R_o$ and initial angular displacement $\theta_o$ of the curve on which the selected alphabetic characters, numerals, symbols, designs, etc. are to be sewn or embroidered. An example of the foregoing transformation can be shown graphically in FIGS. 2 and 3 which respectively illustrate an alphabetic character and a stitch point in a straight field of stitch points, and the "transformed" alphabetic character and stitch point in a curved field of stitch points. In essence, the straight field of stitch points shown in FIG. 2 is "mapped" or "projected" onto the curved field shown in FIG. 3. The foregoing is accomplished by defining each point in FIG. 2 by its x and y cartesian co-ordinates relative to a selected starting reference point and then transforming the straight point field onto the curved field in FIG. 3 wherein each point can be defined by a polar co-ordinate radius R and an angle $\theta$. The foregoing transformation is accomplished by taking each point (x, y) in FIG. 2, defining a transformed point in the curved field in terms of the polar co-ordinates R and $\theta$, and then defining corresponding cartesian coordinates, identified as x', y' in FIG. 3, for that point in the following manner:

The radial component R of the polar coordinates of the point identified as x', y' in FIG. 3 is:

$$R = R_o + y \quad (1)$$

The angular component $\theta$ of the polar coordinates of the point identified as x', y', in FIG. 3 is:

$$\theta = \theta_o + x/R_o \quad (2)$$

where $R_o$ and $\theta_o$ are the desired initial radius and the initial angular displacement of the curved field of points, respectively, as entered by the operator or determined from other parameters. But the cartesian co-ordinates of point x', y' can be related to polar co-ordinates by the following relationships:

$$x' = R \cos \theta$$

$$y' = R \sin \theta \quad (3)$$

Substituting equations 1 and 2 into equation 3 results in the following:

$$x' = [R_o + y]\left[\cos\left(\theta_o + \frac{x}{R_o}\right)\right] \quad (4)$$

$$y' = [R_o + y]\left[\sin\left(\theta_o + \frac{x}{R_o}\right)\right]$$

Thus, each stitch point in the curved stitch field can be defined by a new set of cartesian co-ordinates which are a function of the cartesian co-ordinates of the point in the original straight stitch field and the desired or calculated initial radius $R_o$ and the initial angular displacement $\theta_o$ of the curve on which the selected alphabetic characters, numerals, symbols, designs, etc. are to be sewn or embroidered. After completing the foregoing transformation for a stitch point, the stitch movement command generator 24 produces a new stitch movement command or commands from the previously completed stitch point to the newly transformed stitch point in the new set of cartesian co-ordinates and transmits same to the stitching apparatus 12 which translates the new stitch movement command or commands into incremental movements of a cloth frame in the x direction and/or the y direction. Such movements of the cloth frame are typically controlled by individual stepping motors or servo motors whose operation and control are well known in the art and thus will not be described. In this manner, the incremental movements of the cloth frame can be controlled so that the selected alphabetic characters, numerals, symbols, designs, etc. are sewn or embroidered on the desired curve. Alternatively, the new stitch movement commands can be transmitted to the second memory or storage device 22 for storage purposes or for conversion into a punched paper tape, as previously described.

Alternatively, the stitch movement commands stored in the second memory or storage device 22 can be retrieved from same and integrated by the stitch movement command converter 26 to determine a stitch point corresponding to the end of the stitch movement. This stitch point can then be processed by by the curve generator 20, as hereinbefore described. In this way, existing designs, logos, names, etc. from a punched paper tape can be stitched along a curve having a desired initial radius $R_o$ and initial angular displacement $\theta_o$.

Certain modifications and improvements will occur to those skilled in the art upon reading the foregoing. It should be understood that all such modifications and improvements have been deleted herein for the sake of conciseness and readability but are properly within the scope of the following claims.

I claim:

1. Apparatus for transforming stitch points in a first orientation relative to one another into stitch points in a second orientation relative to one another comprising:

means for generating stitch points in said first orientation, said generating means comprising a stitch point generator which receives data for stitch points and transforms said data into stitch points in said first orientation; and means for transforming said stitch points produced by said generating means into stitch points in said second orientation, said stitch point transforming means comprising means for determining the cartesian co-ordinates of said stitch points produced by said generating means, means for transforming said cartesian co-ordinates of said stitch points into new positions in said second orientation, and means for determining the cartesian co-ordinates of said new positions of said stitch points in said second orientation.

2. The apparatus as defined in claim 1 further including means for storing data required for the generation of stitch points.

3. The apparatus as defined in claim 1 wherein said stitch point generator receives data for a stitch point from said data storing means and transforms said data into a stitch point in said first orientation.

4. The apparatus as defined in claim 1 further including means for generating one or more stitch movement commands for each stitch point in said second orientation.

5. The apparatus as defined in claim 4 further including means for storing said stitch movement commands produced by said stitch movement command generating means.

6. The apparatus as defined in claim 1 wherein said stitch point generating means comprises means for storing stitch movements commands and means for converting one or more stitch movement commands into a stitch point in said first orientation, said converting means receiving said one or more stitch movements commands from said stitch movement command storing means.

7. The apparatus as defined in claim 4 further including means for stitching said stitch point in said second orientation, said stitching means being responsive to said one or more stitch movement commands produced by said stitch movement command generating means.

8. The apparatus as defined in claim 1 wherein said first orientation is a straight stitch field and said second orientation is a curved stitch field.

9. The apparatus as defined in claim 1 wherein said first orientation is a straight stitch field and said second orientation is a stitch field which conforms to a curve having a desired or determined radius and angular displacement.

10. Apparatus for transforming stitch points in a first orientation relative to one another into stitch points in a second orientation relative to one another comprising:

means for storing data required for the generation of stitch points;

means for selecting data from said data storing means for stitch points in said first orientation and inputting data relating to said stitch points in said second orientation;

means for generating stitch points in said first orientation from said data provided by said selecting means, said generating means comprising a stitch point generator which transforms said data provided by said selecting means into stitch points in said first orientation; and means for transforming said stitch points produced by said generating means into stitch points in said second orientation, said stitch point transforming means comprising means for determining the cartesian co-ordinates of said stitch points produced by said generating means, means for transforming said cartesian co-ordinates of said stitch points into new positions in said second orientation, and means for determining the cartesian co-ordinates of said new positions of said stitch points in said second orientation.

11. The apparatus as defined in claim 10 further including means for generating one or more stitch movement commands for each of said stitch points in said second orientation.

12. The apparatus as defined in claim 11 further including means for storing said stitch movement commands produced by said stitch movement command generating means.

13. The apparatus as defined in claim 10 further including means for storing stitch movement commands and means for converting one or more stitch movement commands into a stitch point in said first orientation, said converting means receiving said one or more stitch movement commands from said stitch movement command storing means.

14. The apparatus as defined in claim 11 further including means for stitching said stitch point in said second orientation, said stitching means being responsive to said one or more stitch movement commands produced by said stitch movement command generating means.

15. The apparatus as defined in claim 10 wherein said first orientation is a straight stitch field and said second orientation is a curved stitch field.

16. The apparatus as defined in claim 10 wherein said first orientation is a straight stitch field and said second orientation is a stitch field which conforms to a curve having a desired or determined radius and angular displacement.

17. Apparatus for stitching material along a particular orientation comprising:
   means for storing data required for the generation of stitch points;
   means for selecting data from said data storing means for stitch points in a first orientation relative to one another and inputting data relating to said stitch points in a second orientation relative to one another;
   means for generating stitch points in said first orientation from said data provided by said selecting means, said generating means comprising a stitch point generator which transforms said data provided by said selecting means into a stitch points in said first orientation;
   means for transforming said stitch points produced by said generating means into stitch points in said second orientation, said stitch point transforming means comprising means for determining the cartesian co-ordinates of said stitch points produced by said genreating means, means for transforming said cartesian co-ordinates of said stitch points into new positions in said second orientation, and means for determining the cartesian co-ordinates of said new positions of said stitch points in said second orientation;
   means for generating one or more stitch movement commands for each of said stitch points in said second orientation; and
   means for stitching said stitch points in said second orientation, said stitching means being responsive to said one or more stitch movement commands produced by said stitch movement command generating means.

18. The apparatus as defined in claim 17 further including means for storing said stitch movement commands produced by said stitch movement command generating means.

19. The apparatus as defiined in claim 17 further including means for storing stitch movement commands and means for converting one or more stitch movement commands into stitch point in said first orientation, said converting means receiving said one or more stitch movement commands from said stitch movement command storing means.

20. The apparatus as defined in claim 17 wherein said first orientation is a straight stitch field and said second orientation is a curved stitch field.

21. The apparatus as defined in claim 17 wherein said first orientation is a straight stitch field and said second orientation is a stitch field which conforms to a curve having a desired or determined radius and angular displacement.

* * * * *